United States Patent [19]

Awai et al.

[11] Patent Number: 4,763,984
[45] Date of Patent: Aug. 16, 1988

[54] LIGHTING APPARATUS AND METHOD

[76] Inventors: George K. Awai, 61186 Ikuwai, Haleiwa, Hi. 96712; Michael D. Ernst, 4 Sheri Ct., Danville, Calif. 94526

[21] Appl. No.: 113

[22] Filed: Jan. 2, 1987

[51] Int. Cl.$^4$ .......................... G02B 6/00; G02B 6/04; F21V 7/04

[52] U.S. Cl. .................. 350/96.24; 350/96.10; 362/32

[58] Field of Search ............... 350/96.10, 96.24, 96.29; 362/32

[56] References Cited

U.S. PATENT DOCUMENTS

| | | | |
|---|---|---|---|
| 2,058,900 | 10/1936 | McDonald | 40/130 |
| 2,173,371 | 9/1939 | Penoyer | 40/130 |
| 3,038,271 | 6/1962 | Mac Hutchin et al. | 40/130 |
| 3,208,174 | 9/1965 | Wrenshall | 40/130 |
| 3,382,353 | 5/1968 | Wappler | 240/1 |
| 3,389,247 | 6/1968 | Null | 240/10 |
| 3,441,957 | 4/1969 | Friedman | 240/26 |
| 3,497,981 | 3/1970 | Tyne | 40/130 |
| 3,536,908 | 10/1970 | Oster | 240/10.1 |
| 3,733,481 | 5/1973 | Kyut | 240/47 |
| 3,775,606 | 11/1973 | Bazell et al. | 240/47 |
| 3,813,514 | 5/1974 | Canty | 219/354 |
| 4,025,779 | 5/1977 | Ahroni | 240/10 |
| 4,128,332 | 12/1978 | Rowe | 355/67 |
| 4,236,191 | 11/1980 | Martinez | 362/32 |
| 4,422,719 | 12/1983 | Orcutt | 350/96.10 X |
| 4,425,599 | 1/1984 | Rieder et al. | 362/32 |
| 4,425,907 | 1/1984 | Younghouse | 350/96.10 X |
| 4,454,568 | 6/1984 | Stadnik | 362/32 |
| 4,466,697 | 8/1984 | Daniel | 350/96.10 X |
| 4,564,261 | 1/1986 | Kojima et al. | 350/96.24 |
| 4,569,334 | 2/1986 | Ohshiro | 128/6 |
| 4,637,686 | 1/1987 | Iwamoto et al. | 350/96.10 X |

FOREIGN PATENT DOCUMENTS 0207204 12/1982 Japan ........................ 350/96.10
WO86/05858 10/1986 PCT Int'l Appl. .

Primary Examiner—William L. Sikes
Assistant Examiner—Akm E. Ullah

[57] ABSTRACT

Improved lighting apparatus and method for use in decorative and in hazardous environments uses optical fibers which are illuminated from one or both ends, and which are configured to support higher order modes of light flux propagating therein to produce substantial lateral emissions of light flux through the surface of the fibers along the entire length thereof.

5 Claims, 6 Drawing Sheets

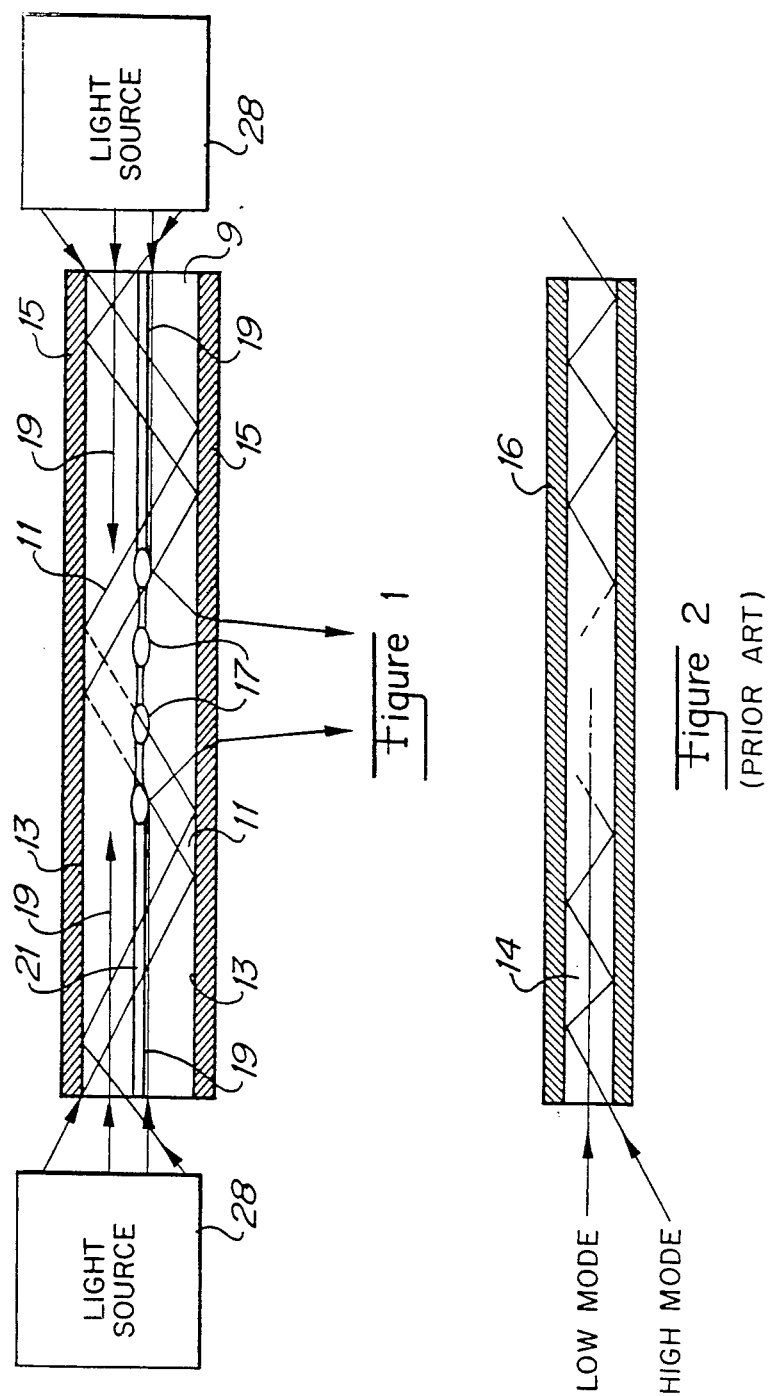

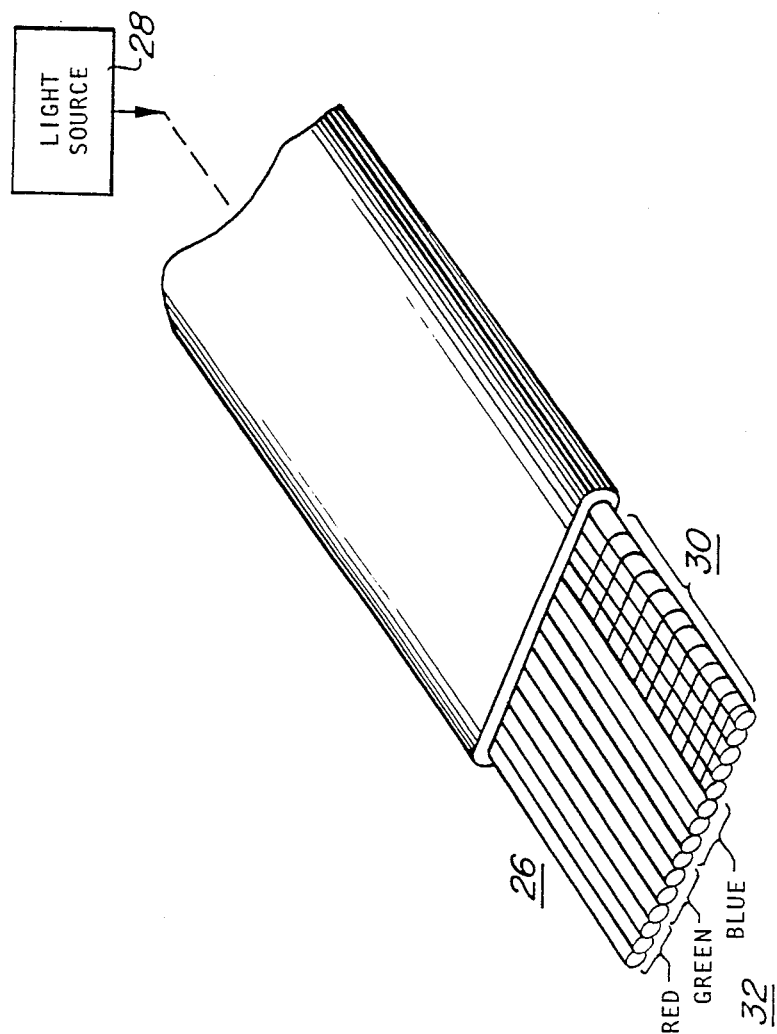

4,763,984

LIGHTING APPARATUS AND METHOD

BACKGROUND OF THE INVENTION

In numerous electrical lighting applications, proper area lighting or spot lighting is essential to highlight potentially hazardous conditions, or to satisfy building code requirements. In outdoor lighting applications, it is common to light steps and walkways for safety and to spot light certain regions or objects for decorative effects. It is also common to illuminate swimming pools for both night time safety and decorative effect.

In indoor lighting applications, it is essential for safety and code requirements to reliably illuminate exits inside public buildings, and it is frequently desirable to provide decorative effects with accent lighting at selected locations in rooms and hallways.

In hazardous environments, electrical lighting apparatus is commonly insulated or sealed off from the environment in order to minimize the risks of fire or explosion or electrocution, or the like, due to failure of the lighting apparatus. In addition, it is frequently desirable to have reliable indicator lights such as exit signs and direction indications in public hallways be fabricated to withstand fire and smoke and heat so that the vital functions of such lights are not immediately destroyed by the hazard in which they are intended to provide visual assistance.

SUMMARY OF THE INVENTION

Accordingly, in accordance with the present invention, lighting apparatus for decorative and safety purposes and for operation in hazardous conditions is provided by fiber optic light channels which are fabricated to exhibit enhanced lateral light emissions through the surface cladding over the lengths of the fibers from one or more light sources oriented near the end or ends of the optical fibers. The fibers are specially prepared to support higher-order modes of light propagation therealong with associated lateral light emission through the side walls. In addition, light flux may be coupled into the fibers from both ends thereof to enhance the surface emission of high levels of light flux along the length. The fibers are also specially packaged and supported to provide an inexpensive strip of light of substantial length for highlighting borders, hallways and the like. The present lighting apparatus produces various color-gradient effects, and isolated light sources may be used to operate the lighting apparatus of the present invention in hazardous environments.

DESCRIPTION OF THE DRAWINGS

FIG. 1 is a sectional view of an optical fiber according to one embodiment of the present invention;

FIG. 2 is a sectional view of a conventional optical fiber;

FIG. 6 is a pictorial view of another embodiment of the lighting apparatus according to the present invention.

DESCRIPTION OF THE PREFERRED EMBODIMENT

Figure 3:
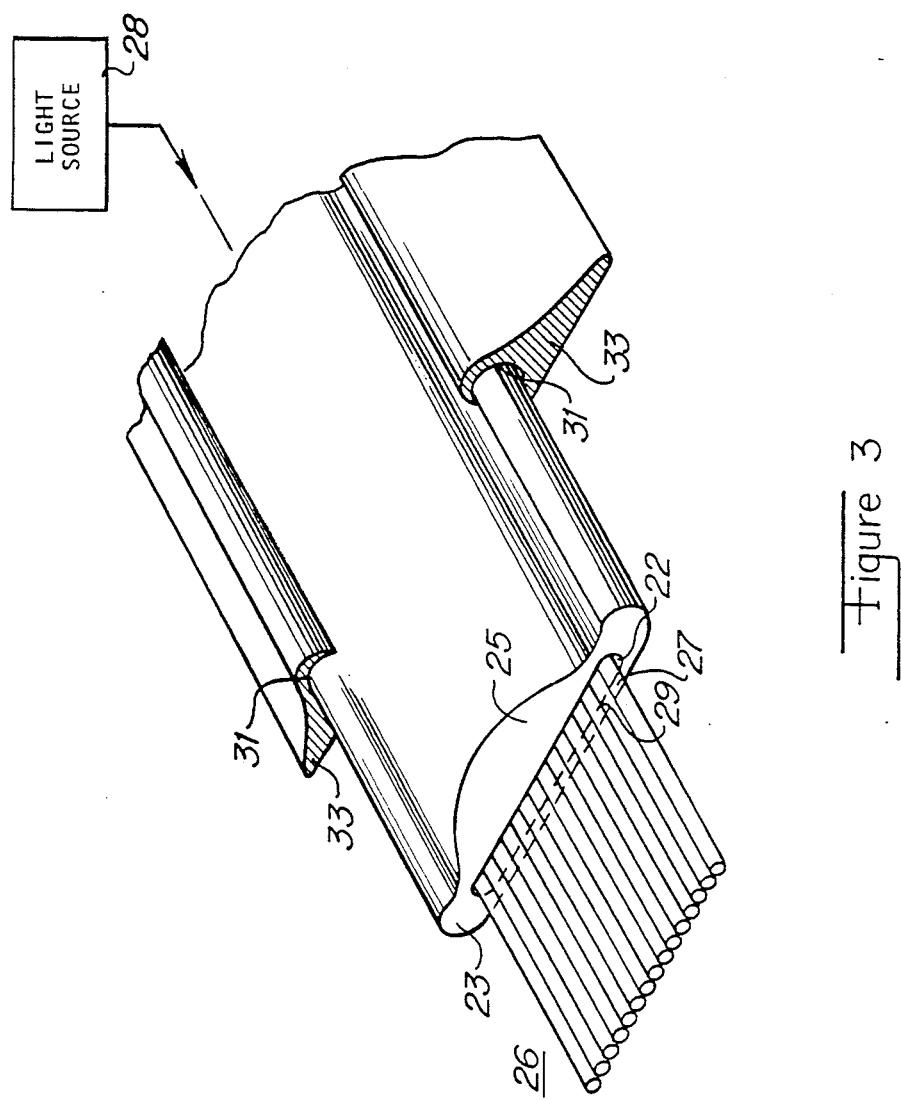
FIG. 3 is a pictorial, sectional view of lighting apparatus according to the present invention.

Referring now to FIG. 1, there is shown a pictorial, sectional view of an optical fiber according to one embodiment of the invention. The light-transmissive core 9 may be glass, or plastic, or other optical transmitting materials with high index of refraction and with a surface-cladding coating 15 of different index of refraction. Optical fibers are commonly configured in this manner in small core diameters 14 of the order of 3 to 100 microns to assure substantial propagation of light flux in lower order modes from one end to another with only negligible losses through the surface cladding. Indeed, conventional fibers, as illustrated in the sectional view of FIG. 2, commonly are coated with a material 16 such as silicon dioxide or TEFLON-brand plastic material to assure that incident light flux at one end of the fiber propagates therethrough in lower order and fundamental modes to emerge substantially undiminished or unaffected from the other end.

In contrast, the fibers of the present invention are formed in a manner which supports higher order modes and resulting lateral emission of light from the surface of the fiber along the length thereof.

Enhanced lateral emission of light flux from the surface of the fiber is accomplished in several ways according to the present invention. First, the diameter of the fiber core 9 is typically of the order of 400 to 1000 microns in diameter, or several times the diameter of conventional fiber cores. Larger diameter cores 9 are desirable for supporting higher order modes of propagation of light flux in the core by way of multiple reflections of light from the microetched boundary 13 of the core material 9 and the transparent clad material 15 of different index of refraction. By selecting the diameter of the fiber core 9 suitably, the angle of incidence of light upon the boundary 13 approaches the critical angle at which substantially all the incident light emerges through the clad material 15, and little reflects internally within the core material 9. However, in accordance with the present invention, it is desirable to select the diameter and material of the core 9 to assure that the light flux at a select wavelength also propagates in lower order modes along the fiber so that light flux is also available to emerge from the clad material 15 substantially uniformly with distance away from the light source 28 (up to about 250 feet). In addition, the boundary 13 may include surface irregularities on the fiber core 9 to enhance lateral emission of light flux. Specifically, the surface of the fiber core 9 may have a surface roughness of approximately 0.3 micron anomalies which can be provided in many ways. By way of example, the fiber core 9 of glass material may be chemically etched with hydrofluroic acid, or plastic fiber cores 9 may be roughened with about #600 grit-size abrasive, or the surface of the die through which the fiber core 9 is extruded may be roughened in order to form a roughened surface at the boundary 13. Thus, the surface anomalies on fiber core 9 may be radially or longitudinally oriented, or both.

In accordance with the present invention, the fiber core 9 may also include light-scattering centers 17 disposed within the core to enhance the higher-order modes of propagation along the core, and thereby to enhance lateral emission of light through the clad material 15. Preferably, the scattering centers 17 may be centrally oriented within the core material 9 along the length thereof to intercept and reflect or diffuse light flux 19 that is substantially aligned with the central axis 21 of the core material 9. These scattering centers 17 may be formed of transparent material such as glass or plastic having an index of refraction that is different from the index of refraction of the core material 9. Alternatingly, the scattering centers 17 may be of translucent or opaque material such as vitrified glass or glass particles, or the like, which serve as light diffusion centers. In another embodiment, the change of index of refraction at scattering centers is accomplished by forming minute bubbles within the core material 9 at selected intervals in the central region of the core material along its length. Alternatingly, scattering centers may be dispersed throughout the cross section and length of the core material 9 to diffuse or reflect light flux that is propagating in lower order modes into light flux having lateral component for emission through the clad material 15. Ideally, light scattering centers 17 of any of the types described above may be distributed along the fiber with density (i.e., number or size of scattering centers per unit length) that increases with distance from an end in order to provide substantially uniform light flux density emitted through the clad material 15 over the length of the fiber.

In one embodiment of the present invention, light flux from a light source 20 may be coupled to each end of a fiber to enhance total light flux emitted laterally from the fiber over the entire length thereof between lights sources at the ends. Of course, a single light source may be coupled to both ends of the optical channels to form a loop lighting configuration. In these embodiments, the light scattering centers 17 may be distributed with density that increases with distance from each end to produce a maximum density of scattering centers at a location intermediate the ends thereof. Fibers of this type may therefore be illuminated from both ends to emit light laterally and with substantially uniform intensity over the length thereof between light sources.

Referring now to FIG. 3, there is shown a pictorial, sectional view of lighting apparatus according to the present invention. An extrusion 23 of glass or plastic transparent material includes a longitudinal channel 22 intermediate a lens region 25 and underside reflector region 27 for supporting therein a plurality of optical fibers 26 of the type described above, positioned substantially in side-by-side relationship across the width of the channel 22. The lens region 25 may have a double convex cross-sectional shape along the length of the extrusion 23 or a single convex, as shown, or other desirable lens shape above the fibers 26. The optical fibers 26 are disposed above the reflector region 27 which may include a "mirrored" or white surface 29 for improved spectral reflections of light that emerges laterally from the optical fibers 26. Thus, light from a light source 28 which is laterally emitted from fibers 26 toward the reflector region 27 is reflected or diffused toward the lens region 25 and combined with light which is laterally emitted from fibers 26 toward the lens region 25 to emerge from the outer surface of lens region 25 with enhanced intensity. The extrusion 23 may include one or more support channels 31 along the opposite sides for interlocking engagement with support rails 33 along the length of the extrusion. Of course, the entire assembly including lens region 25, reflector region 27 and support rails 33 may constitute a single extrusion for incorporation around the optical fibers 26 that form the light-transmission channel. In another embodiment, the light-transmission channel may be formed as a flat ribbon "fiber" instead of by a plurality of side-by-side cylindrical fibers disposed in a substantial ribbon-like configuration. Suitable materials for the extrusion 33 include glass for the lens and reflector regions 25,27 to completely encase the optical fibers 26, or plastic materials such as polyvinylchloride, polystyrene, or polymethamethacrylate for the lens and reflector regions 25,27 and side rails 33.

Figure 4:
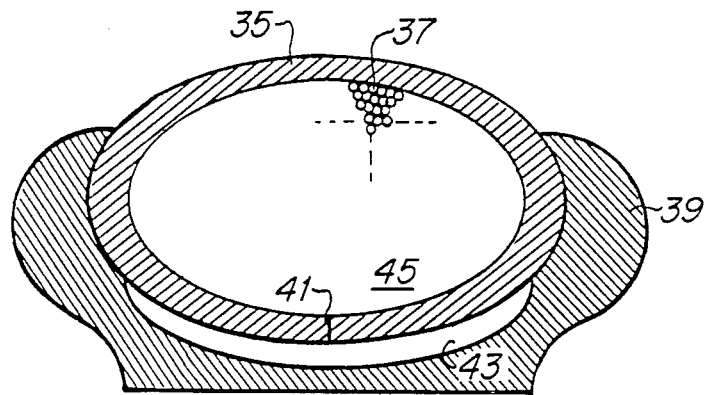
FIG. 4 is a sectional view of an extruded assembly according to the present invention.

Referring now to FIG. 4, there is shown a sectional view of another extruded assembly including the oval- or elliptical-shaped casing 35 surrounding the optical fibers 37, and a support element 39 which may be continuously disposed along the casing 35 or disposed only at selected intervals therealong. In this embodiment, the optical fibers 37 contained within the casing are disposed to emit light laterally through the casing, the shape of which thus forms a lens-like structure. The casing 35 may be extruded of such materials as glass or plastic to completely encase the fibers 37, or a lengthwise slit 41 may be provided on the underside of the casing (extruded of resilient plastic material) to facilitate assembly of the casing 35 around the optical fibers 37. The support element 39 may be extruded of resilient plastic material, and may have a "mirrored" or white surface on the inner, central surfaces 43 thereof to improve the spectral and diffusive optical properties thereof, for the reasons previously described. Alternatively, the walls 45 of the casing 35 in the inner or lower section may include "mirrored" or white surfaces, while the walls 46 in the outer or upper section remain transparent to improve the light emission efficiency of the assembly for light flux that emanates laterally from the optical fibers 37. Suitable materials for the casing 35 include glass, or plastics such as polyvinylchloride, polystyrene, and polymethamethacrylate for flexible and inexpensive casings.

In each of the embodiments illustrated in FIGS. 3 and 4, the light apparatus is ideally suited for operation within potentially hazardous environments such as in or near water in swimming pools, ships, or outdoor walkways, and the like, where the prospects of electrical shock can be completely eliminated, and the presence of water or moisture is not detrimental to the apparatus. Similarly, in public buildings, the present lighting apparatus is well suited for hallway illumination in lengthy strips. More importantly, the light source or sources for illuminating one or both ends of the optical fibers may be disposed within protected areas such as within airshafts, and the optical channel may be mounted along the ceiling or lower at baseboard level along the hallways as reliable guideways toward exits for use in cases of dense smoke which may obliterate clear vision of conventional exit signs. Similarly, the lighting apparatus of the present invention may be used within the passenger compartments of airplanes and in other such applications requiring high levels of reliability and immunity from hazardous operation to designate walkways, exit doors, and the like. Additionally, the fiber optic bundles and encasements according to the present invention are readily able to conform to curves and corners, and penetrate walls and bulkheads when being installed in great lengths at distances away from the light source or sources at one or both ends of the light channel.

Figures 5A, 5B:
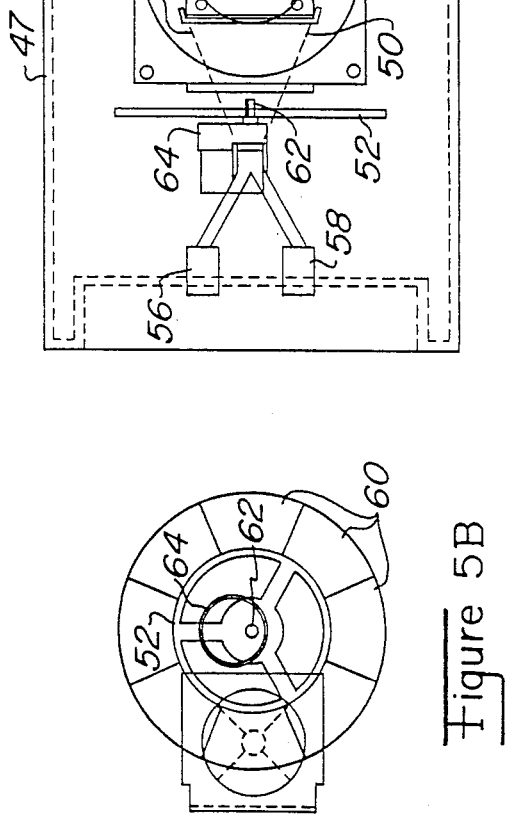
FIGS. 5a and 5b are, respectively, top and end views of a light source according to the present invention.

Referring now to FIGS. 5a and 5b, there are shown top and end views, respectively, of a light source and housing for illuminating the optical fibers in a manner suitable for enhancing the higher-order modes of light flux within the optical fibers. Such a light source and housing may be attached to the optical channel 22 of an assembly at one end, or at both ends, thereof to provide ample light flux within the optical fibers for substantially uniform lateral emission from the fibers over the length thereof. Specifically, the housing 47 includes a light bulb and reflector system 49 for focussing light 50 through a color wheel 52 onto the input end of a beam splitter 54 of conventional design. The dual-port channel 54 provides two output ports 56, 58 to which the optical fibers of the present lighting apparatus may be attached. The two output ports 56, 58 provide basis for illuminating both ends a given optical fiber light channel (in loop configuration), or for illuminating single ends of separate optical fiber light channels (in continuous configuration). The color wheel 52 includes a plurality of perimeter sectors 60 of different color, transparent light filters mounted for rotation on the shaft 62 of drive motor 64. The motor 64 and the light bulb of hte system 49 may be operated on the low-voltage output of transformer 66. Switches 68,69 are wired in circuit with the motor 64 and light bulb to control the output of light at a selected color or wavelength, or at continuously-changing colors, as deisired.

In accordance with another embodiment of the present invention, a light source or sources at one or both ends of the optical channel may emit 'white' light or may emit radiation at selected wavelengths within the range from infrared to ultraviolet (all referred to herein as "radiation"). In applications where light sources are used at each end of the optical channel, such light sources may be operated at different wavelengths of radiation to provide color gradations with distance from a light source. Specifically, where light sources are disposed at both ends of the optical channel, and are operated at different primary color frequencies or wavelengths, the color gradations of light emitted laterally from the channel vary from substantially one primary color near one source, to the resultant color of two primary colors in the central region of the channel between sources, to substantially the other primary color near the other light source at the opposite end of the optical channel. Similarly, the optical channel may be formed of plastic material such as polymethamethacrylate, or the like, and be embedded with ultraviolet-sensitive or other actinically-sensitive dyes such as fluorene that respond differently to ultraviolet light at selected locations along the length of the channel. In this embodiment, the light source or sources 28 at one or both ends of the channel may illuminate the optical channel 26 with ultraviolet light which then stimulates emission of radiation by the embedded dyes at various color wavelengths along the length of the optical channel 26. Similar operating characteristics may be achieved using optical channels of different colored material to serve as color filters which enhance emission of light of different colors from the surface of the optical channel. The color of the material forming the optical channel may vary with length along a particular fiber 30, or may vary from fiber to fiber 32, or may vary in a combination of the above characteristics, as illustrated in FIG. 6, to provide light that emanates from the optical channel over the length thereof that varies in color over the entire visible spectrum with length or width, or both, of the optical channel 26.

Figure 7:
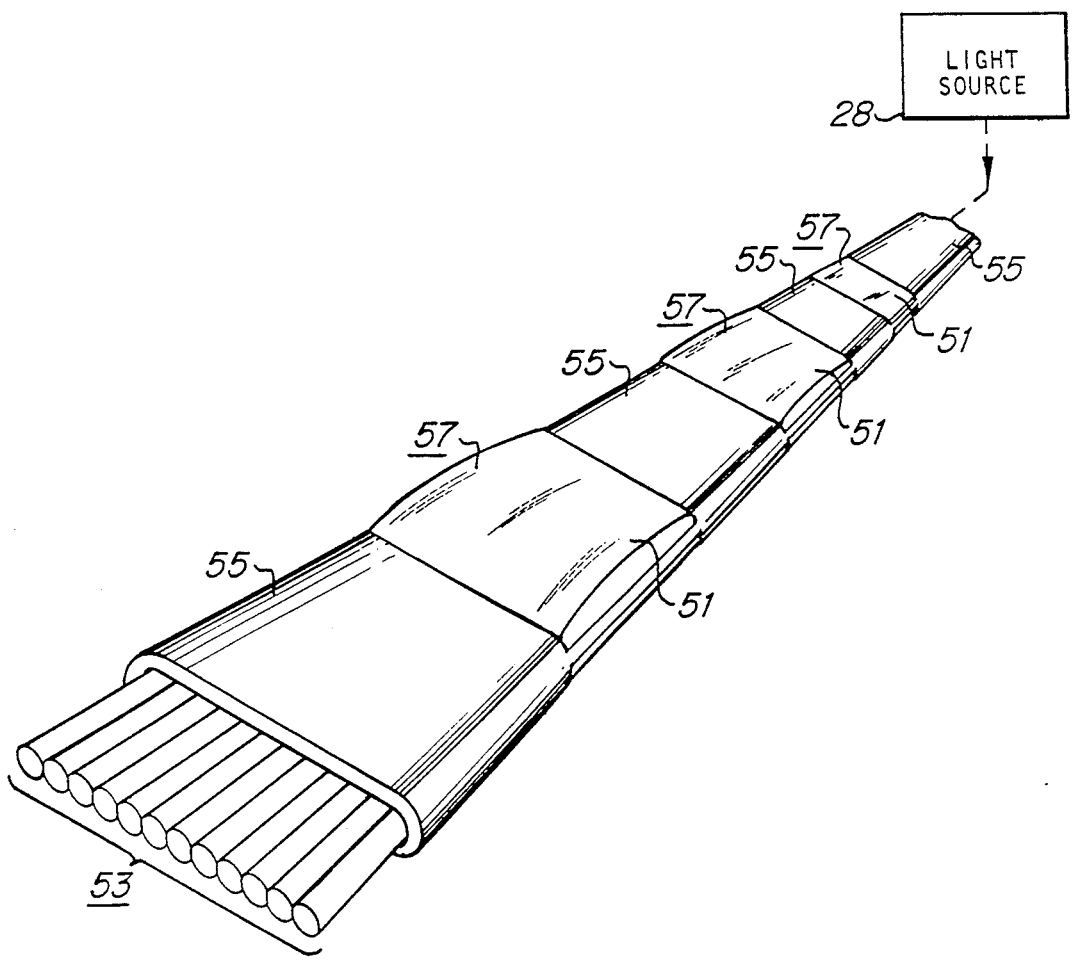
FIG. 7 is a pictorial view of another embodiment of the lighting apparatus according to the present invention.

Referring now to FIG. 7, there is shown a pictorial view of another embodiment of the present invention in which transparent windows 51 are disposed at selected intervals along the optical channel 53 between opaque or less transmissive regions 55. The interior surfaces of the opaque regions 55 may include "mirrored" or white surfaces to efficiently reflect light from the light source 28 that is laterally-emitted from the optical channel in such regions back into the optical channel to preserve the total light flux available within the channel for lateral emission only through the window regions 51 at the selected locations. Lenses 57, for example, of cylindrical cross-section may be disposed over the window regions 51 to enhance the directionality of light emanating from the window regions 51. Lighting apparatus of this type is well suited for use as decorative lighting where each window region 51 may include different color filters.

Therefore, the lighting apparatus and method of the present invention provides lighting for hazardous and decorative applications using optical fibers which are formed to enhance lateral emission of light from the fibers, and which can be illuminated from both ends to enhance luminous intensity of emitted light. Additionally, the lighting apparatus and method of the present invention is suitable for illuminating hallways and exit passages in public structures with a high degree of immunity from adverse effects of fire and smoke, which immunity is attributable to the light source or sources being mounted in a protected location. Decorative color effects are made possible by using selected combinations of colored fiber optic materials, actinically-sensitive dyes, and light sources of different colors.

We claim:

1. Lighting apparatus comprising:
    an optical transmission channel including a plurality of optically-transmissive fibers, each having a core of radiation-transparent material having a selected index of refraction and having a radiation-transparent cladding material of different index of refraction than said selected index on the surface of said core at least along selected portions of the length thereof, each of said fibers having cross sectional dimension for supporting the propagation of radiation therethrough along an elongated axis in a mode including a component of radiation propagation that is laterally oriented with respect to the elongated dimension for emitting radiation through the radiation-transparent cladding material, and each of said fibers including radiation scattering means for dispersing radiation in the fibers in a direction having a lateral component for emerging from the transparent cladding material at least along said selected portions of the length thereof;
    actinically-sensitive material disposed within at least one of said core and said cladding material of each fiber which includes anomalies from smooth with approximately 0.3 micron dimensions; and
    source means of radiation coupled to said channel for introducing radiation into said fibers to propagate therein in said mode for emitting said radiation through the transparent cladding material at least along said selected portions of the length thereof.

2. Lighting apparatus for distributing light flux from a light source, the apparatus comprising;

an optical radiation transmission channel including a plurality of optical fibers disposed in a configuration having a width dimension greater than the thickness dimension thereof, said fibers each having a radiation-transparent core material of selected index of refraction and a radiation-transparent cladding material of different index of refraction than said selected index of refraction at least along selected portions of the length thereof and having cross sectional dimension for supporting the propagation of radiation therethrough along an elongated axis in a mode including a component of radiation propagation that is laterally oriented with respect to the elongated dimension for emitting radiation from the transparent surface of said cladding material at least along said selected portions of the length of the fibers;

lens means disposed on at least one side of the optical fibers at selected locations along the length thereof;

reflector means disposed on another side of the fibers substantially opposite the lens means at the selected locations for reflecting radiation laterally emitted from the fibers in the direction toward the lens means; and support means including the lens means positioned on one side of the configuration of fibers and the reflector means on another side of the fibers for retaining the optical fibers in orientation between the lens means and reflector means at least at said selected locations along the length thereof.

3. Lighting apparatus comprising:

an optical transmission channel including a plurality of optically-transmissive fibers, each having a core of radiation-transparent material having a selected index of refraction and having a radiation-transparent cladding material of different index of refraction than said selected index on the surface of said core at least along selected portions of the length thereof, each of said fibers having cross sectional dimension for supporting the propagation of radiation therethrough along an elongated axis in a mode including a component of radiation propagation that is laterally oriented with respect to the elongated dimension for emitting radiation through the radiation-transparent cladding material, and each of said fibers including radiation scattering means for dispersing radiation in the fibers in a direction having a lateral component for emerging from the transparent cladding material at least along said selected portions of the length thereof;

said scattering means includes a plurality of material anomalies in the core material disposed along the elongated dimension of the fibers for deflecting radiation into said lateral direction and through the cladding material of the fibers at least along said selection portions of the length thereof; and source means of radiation coupled to said channel for° introducing radiation into said fibers to propagate therein in said mode for emitting said radiation through the transparent cladding material at least along said selected portions of the length thereof.

4. The method of distributing radiation comprising the steps of;

forming a radiation transmission channel having an elongated dimension and including a plurality of optical fibers, each having a radiation-transparent core material of selected index of refraction and a radiation-transparent cladding material of different index of refraction than said selected index of refraction at least along selected portions of the length thereof and having cross sectional portions of the length thereof and having cross sectional dimension for supporting the propagation of radiation therethrough along an elongated axis in a mode including a component of radiation propagation that is laterally oriented with respect to the elongated dimension for emitting radiation from the transparent surface of said cladding material at least along said selected portions of the length of the fibrs, the channel being formed to scatter radiation propagating in the longitudinal mode to radiation propagating in the lateral mode for emission of radiation from the surface of the cladding material of the fibers in the channel, and the fibers being oriented in an array over a portion of the length thereof which has a width dimension greater than the thickness dimension;

introducing radiation from the light source into the fibers of the transmission channel; and propagating radiation along the transmission channel in a mode having a component of radiation propagation direction that is laterally oriented with respect to the elongated dimension for emitting radiation from the cladding material of the fibers at least selected locations along the length thereof.

5. The method of distributing radiation comprising the steps of:

forming a radiation transmission channel having an elongated dimension and including a plurality of optical fibers, each having a radiation-transparent core material of selected index of refraction and a radiation-transparent cladding material of different index of refraction than said selected index of refraction at least along selected portions of the length thereof and having cross sectional dimension for supporting the propagation of radiation therethrough along an elongated axis in a mode including a component of radiation propagation that is laterally oriented with respect to the elongated dimension for emitting radiation from the transparent surface of said cladding material at least along said selected portions of the length of the fibers, the channel being formed of a plurality of fibers the surface of the core material of which is roughened with the surface anomalies from smooth which have dimensions of about 0.3 microns for scattering radiation propagating in the longitudinal mode to radiation propagating in the lateral mode for emission of radiation from the surface of the cladding material of the fibers in the channel and the fibers being oriented in an array over a portion of the length thereof which has a width dimension greater than the thickness dimension;

introducing radiation from the light source into the fibers of the transmission channel; and propagating radiation along the transmission channel in a mode having a component of radiation propagation direction that is laterally oriented with respect to the elongated dimension for emitting radiation from the cladding material of the fibers at least selected locations along the length thereof.

* * * * *